United States Patent
Beaulieu et al.

(10) Patent No.: US 12,552,046 B2
(45) Date of Patent: Feb. 17, 2026

(54) ROBOTIC TOOL CONTROL WITH COMPLIANT FORCE/GEOMETRY SENSOR

(71) Applicant: Toyota Research Institute, Inc., Los Altos, CA (US)

(72) Inventors: Andrew M. Beaulieu, Somerville, MA (US); Naveen Suresh Kuppuswamy, Arlington, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 433 days.

(21) Appl. No.: 17/494,027

(22) Filed: Oct. 5, 2021

(65) Prior Publication Data

US 2023/0103759 A1   Apr. 6, 2023

(51) Int. Cl.
*B25J 13/08*   (2006.01)
*G01L 1/14*   (2006.01)

(52) U.S. Cl.
CPC .............. *B25J 13/084* (2013.01); *G01L 1/14* (2013.01)

(58) Field of Classification Search
CPC .... G01L 5/16; G01L 5/169; G01L 5/22; B25J 13/081–084
See application file for complete search history.

(56) References Cited

U.S. PATENT DOCUMENTS

| | | | | |
|---|---|---|---|---|
| 4,775,961 A * | 10/1988 | Capek | ................ | B25J 13/084 331/107 A |
| 5,689,183 A * | 11/1997 | Kohama | ............ | G01N 27/9046 324/225 |
| 5,905,430 A * | 5/1999 | Yoshino | ................ | B25J 13/084 340/407.1 |
| 6,847,181 B2 | 1/2005 | Brooks et al. | | |
| 7,129,701 B2 * | 10/2006 | LaClair | ................ | G01B 7/023 324/207.16 |
| 7,146,861 B1 * | 12/2006 | Cook | .................... | G01L 9/008 73/753 |
| 7,162,888 B2 * | 1/2007 | Shu | ........................ | B25J 11/00 62/51.1 |

(Continued)

FOREIGN PATENT DOCUMENTS

| | | |
|---|---|---|
| CN | 108527435 A | 9/2018 |
| JP | 2020018254 A | 2/2020 |

OTHER PUBLICATIONS

Calibration and characterization of a magnetic positioning system using a robotic arm (https://www.researchgate.net/publication/329853886_Calibration_and_Characterization_of_a_Magnetic_Positioning_System_Using_a_Robotic_Arm); Dec. 2018; 6 pgs.

*Primary Examiner* — Tran M. Tran
(74) *Attorney, Agent, or Firm* — Dinsmore & Shohl LLP

(57) ABSTRACT

In accordance with one embodiment of the present disclosure, a flexible tactile sensor includes a conductive target positioned in a first plane, a tool holder coupled to the conductive target configured to receive a tool, at least three coils forming an array within a second plane, the second plane spaced apart from the first plane, a pliable material coupling the conductive target to the at least three coils, and an electronic device electrically coupled to each of the at least three coils, the electronic device configured to induce an AC signal within each of the at least three coils and measure a change in inductance in the at least three coils in response to movement of the conductive target.

20 Claims, 9 Drawing Sheets

(56) References Cited

U.S. PATENT DOCUMENTS

| | | | |
|---|---|---|---|
| 7,800,362 B1 * | 9/2010 | Ogawa | G01L 1/14 |
| | | | 73/862.626 |
| 8,338,193 B2 * | 12/2012 | Furumiya | G01R 31/3025 |
| | | | 257/E21.531 |
| 8,661,918 B2 * | 3/2014 | Ohta | B25J 13/085 |
| | | | 73/862.69 |
| 9,016,742 B2 * | 4/2015 | Nammoto | B29C 65/70 |
| | | | 901/34 |
| 9,095,984 B2 | 8/2015 | Miyazaki | |
| 9,364,952 B2 * | 6/2016 | Arai | G01L 5/0071 |
| 9,700,258 B2 * | 7/2017 | Jiang | G01L 1/127 |
| 10,310,028 B2 * | 6/2019 | Latham | G01R 33/0017 |
| 10,359,324 B2 * | 7/2019 | Sipilä | H01F 27/2804 |
| 10,365,172 B2 * | 7/2019 | Tomita | B25J 13/084 |
| 10,386,249 B2 * | 8/2019 | Zhe | A61B 5/053 |
| 10,415,952 B2 * | 9/2019 | Reddy | G01B 7/30 |
| 10,456,923 B2 * | 10/2019 | Sato | G01L 3/1435 |
| 10,649,042 B2 * | 5/2020 | Latham | G01B 7/023 |
| 10,845,215 B2 * | 11/2020 | Kluge | G01D 5/2006 |
| 10,866,150 B2 * | 12/2020 | Lauzier | B25J 9/0081 |
| 10,874,871 B2 * | 12/2020 | Ginhoux | A61N 2/02 |
| 11,117,266 B2 * | 9/2021 | Okuyama | B25J 9/1633 |
| 11,226,211 B2 * | 1/2022 | Mullenix | G01D 5/2225 |
| 11,460,364 B1 * | 10/2022 | Chen | G01L 9/0036 |
| 11,486,773 B2 * | 11/2022 | Sipilä | G01L 1/12 |
| 11,519,753 B2 * | 12/2022 | Gong | G01D 5/202 |
| 11,525,701 B2 * | 12/2022 | Lugani | G01D 5/204 |
| 11,573,140 B2 * | 2/2023 | Lauzier | B25J 9/0081 |
| 11,733,318 B2 * | 8/2023 | Hiligsmann | G01R 33/0047 |
| | | | 324/244 |
| 12,000,749 B2 * | 6/2024 | Beaulieu | G01L 5/228 |
| 12,241,865 B2 * | 3/2025 | Xiao | G01R 33/098 |
| 2007/0214897 A1 * | 9/2007 | Ogawa | B60R 21/01516 |
| | | | 73/862.69 |
| 2013/0160567 A1 * | 6/2013 | Ota | G01L 5/226 |
| | | | 73/862.68 |
| 2020/0346347 A1 | 11/2020 | Sankai | |
| 2021/0016454 A1 * | 1/2021 | Jeong | B25J 15/0061 |
| 2021/0124078 A1 * | 4/2021 | Widmer | G06F 18/217 |
| 2021/0154859 A1 | 5/2021 | Iijima | |
| 2022/0241963 A1 * | 8/2022 | Mizoguchi | B25J 19/021 |
| 2022/0283047 A1 * | 9/2022 | Ogawa | G01L 5/166 |

* cited by examiner

ROBOTIC TOOL CONTROL WITH COMPLIANT FORCE/GEOMETRY SENSOR

TECHNICAL FIELD

The present disclosure relates to flexible tactile sensors, and more particularly to flexible tactile sensors for measuring contact surface normal force using inductive coupling.

BACKGROUND

Tactile sensors are sensors that can measure the parameters that define the contact between the sensor and an object. Tactile sensing can provide robots with a sense analogous to the biological sense of cutaneous touch. The sense of touch includes more than the mere determination of contact with an object. Touch information includes the perception of contact, force, pressure, shape, texture, location, movement, temperature, and pain. For humans, touch is perceived through a variety of receptors in the skin. For robotic systems, electrical and mechanical sensors are implemented to provide various perceptions of touch to the system.

The use of tactile sensors can also be applied to understand the forces being applied by tools used by the robot for more robust use of the tools. For example, a robot may damage a target object or surface by applying too much force, applying an inconsistent force, or applying force in the wrong direction. Conversely, the robot may not be effectively utilizing the tool because it is not applying enough force. To understand the forces being applied by the tools, the forces should be efficiently transferred from the tool to the tactile sensor so that the tactile sensor can accurately measure the forces applied by the tool. This factor may be dependent on the level of compliance of the sensor, but it also may be dependent on how the tool is connected to the sensor. For instance, connections that allow tools to be replaced may not be sufficiently rigid to transfer contact forces to the sensor. The sensor should also be sufficiently compliant to measure forces on a variety of surfaces, such as rigid or non-rigid surfaces. However, sensors that are too compliant may prevent the robot from applying sufficient force to the contact surface via the tool.

Therefore, strategies that allow a robotic arm to understand contact force directions and force magnitudes of an equipped tool are desired.

SUMMARY

In accordance with one embodiment of the present disclosure, a flexible tactile sensor includes a conductive target positioned in a first plane, a tool holder coupled to the conductive target configured to receive a tool, at least three coils forming an array within a second plane, the second plane spaced apart from the first plane, a pliable material coupling the conductive target to the at least three coils, and an electronic device electrically coupled to each of the at least three coils, the electronic device configured to induce an AC signal within each of the at least three coils and measure a change in inductance in the at least three coils in response to movement of the conductive target.

In accordance with another embodiment of the present disclosure, a system includes a computing device communicatively coupled to one or more flexible tactile sensors and a flexible tactile sensor. The flexible tactile sensor includes a conductive target positioned in a first plane, a tool holder coupled to the conductive target configured to receive a tool, at least three coils forming an array within a second plane, the second plane spaced apart from the first plane, a pliable material coupling the conductive target to the at least three coils, and an electronic device electrically coupled to each of the at least three coils, the electronic device configured to induce an AC signal within each of the at least three coils and measure a change in inductance in the at least three coils in response to movement of the conductive target. The computing device is configured to receive one or more signals from the electronic device of at least one of the one or more flexible tactile sensors, the one or more signals corresponding to the measured changes in the inductance in the at least three coils, and determine a magnitude and direction of a normal force of the tool.

Although the concepts of the present disclosure are described herein with primary reference to robotic arms, it is contemplated that the concepts will enjoy applicability to any robotic system.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include sensors and systems for robotic tool control with a flexible tactile sensor. In embodiments, the sensors described herein have a flexible tactile sensor including a conductive target spaced apart from a plurality of induction coils configured in an array and electrically coupled to an electronic device that monitors changes in the inductance in the plurality of induction coils in response to movement of the conductive target. The conductive target and the plurality of induction coils are coupled to each other through a pliable material, which enables the conductive target to move horizontally, vertically, and combinations thereof with respect to the plurality of induction coils when in contact with an object. When contact with the object is removed, the pliable material causes the conductive target to return to an original position with respect to the plurality of coils. The flexible tactile sensors can provide touch information including contact, force, pressure, location, movement, and the like. The touch information may be analyzed to determine normal forces and/or shear forces applied to the conductive target.

In addition to sensors, robots are commonly equipped with end effectors (e.g., tools) that are configured to perform certain tasks. Accordingly, the flexible tactile sensor also includes a tool holder having a receiving end and a connecting end. The receiving end may be affixed to the flexible tactile sensor, and the connecting end may be affixed to the tool. The tool holder has sufficient rigidity so as to not substantially affect the contact force vector measurements of the flexible tactile sensor when the tool is connected to the flexible tactile sensor. The tools that are primarily intended to be used by the tool holder of the present disclosure are tools such as squeegees, spatulas, grinders, peelers, cutting tools, pry bars, and any other tool that may be used to exert continuous forces.

The embodiments depicted in FIGS. 1A-1E and the corresponding description relate to structural elements of the flexible tactile sensors. FIGS. 2A-2B and 3A-3B provide illustrative tool holders affixed to the flexible tactile sensor. FIGS. 4A-4B provide an illustrative tool holder embedded in the flexible tactile sensor. Finally, example conductive target and coil positions are discussed in FIGS. 5A-5D.

Figure 1A:
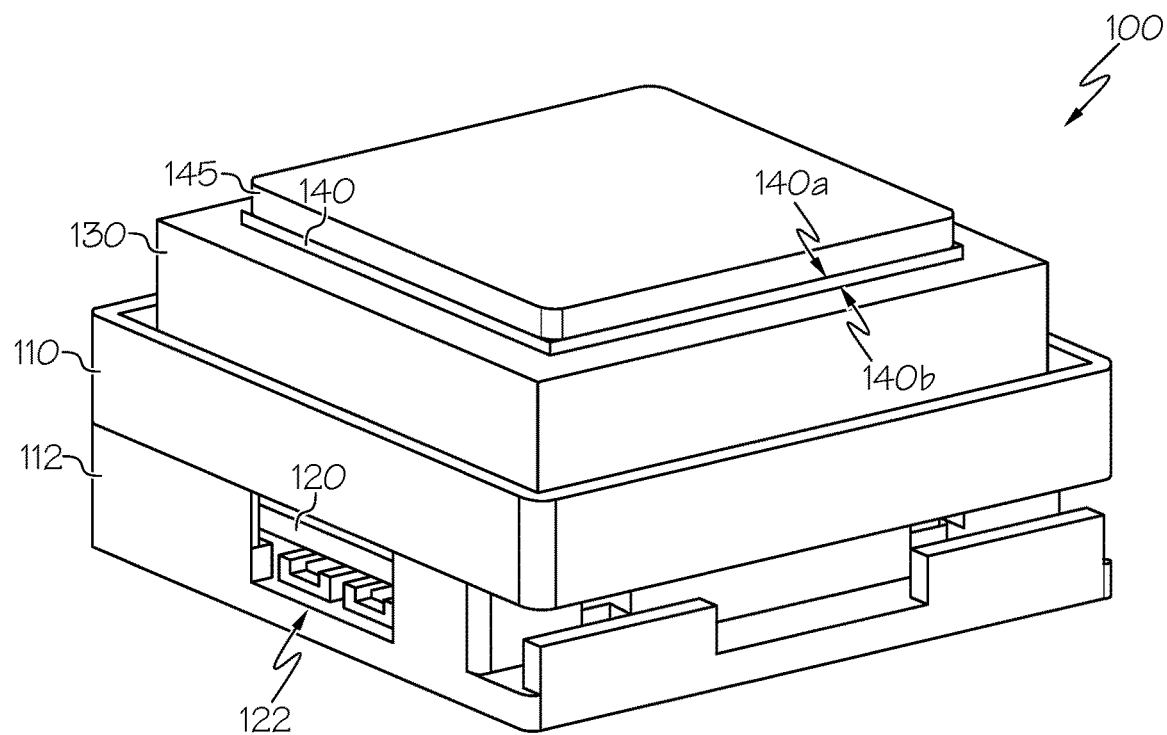
FIG. 1A schematically depicts a perspective view of an illustrative flexible tactile sensor, according to one or more embodiments shown and described herein.

Referring now to FIG. 1A, a perspective view of an illustrative flexible tactile sensor 100 is schematically depicted. It should be understood that embodiments are not limited by the shape or configuration of the example flexible tactile sensor 100 shown in FIG. 1A. Some embodiments of the flexible tactile sensor 100 include a housing having an upper structure 110 coupled to a lower structure 112 forming a cavity therebetween. A printed circuit board (PCB) 120 may be positioned within the cavity of the housing. The PCB 120, as described in more detail herein, may include a plurality of coils 125 and/or other electronic components for enabling the sensing functionality of the flexible tactile sensor 100. The flexible tactile sensor 100 further includes a pliable material 130 coupled to the plurality of coils 125 or to the upper structure 110 of the housing including the PCB 120. The pliable material 130 may be any material that is capable of elastically deforming under an applied force. That is, the pliable material 130 may temporarily deform under an applied force and then return to an initial form when the applied force is removed. The pliable material 130 may be made up of one or more materials or may be a mechanical structure having members that are capable of flexing, folding, bending, or the like under a contact force then returning to an initial state without permanent deformation. An example mechanical structure type of pliable material 130 is depicted and described herein with reference to FIG. 1E.

Still referring to FIG. 1A, the pliable material 130 is further coupled to a conductive target 140. The conductive target 140 is a metal plate or similar material that is spaced apart from the plurality of coils 125 by the pliable material 130. The conductive target 140 may be a metal plate or composite material having a conductive layer that interacts with the magnetic fields generated by the plurality of coils 125. The conductive target has a thickness that is greater than the skin depth of the electric field created in response to the electromagnetic field generated by the plurality of coils 125. This is to ensure that the sensors are responding to the conductive target 140 and the electromagnetic field is not effectively going through the conductive target 140 and responding to conductive items beyond the conductive target 140.

The conductive target 140 has a first surface 140a and a second surface 140b. In embodiments, the surface area of at least the second surface 140b of the conductive target 140 which is oriented to face the plurality of coils 125 has a surface area that is greater than at least one of the plurality of coils 125 and when in a non-contact position extends over one or more of the plurality of coils 125. The second surface 140b is coupled to the pliable material 130. The pliable material 130 enables the conductive target 140 to move with respect to the plurality of coils 125 in response to contact forces applied thereto. For example, the pliable material 130 may compress, twist, translate, or otherwise cause the conductive target 140 to move in response to applied contact forces.

In some embodiments, the conductive target 140 includes a compliant material 145. The compliant material 145 may be coupled to and/or formed over a portion of the conductive target 140. The compliant material 145 may be generally applied to the surface of the conductive target 140 that is opposite the surface coupled to the pliable material 130. The compliant material 145 may be a neoprene, rubber-like, latex, or similar material that assists in providing a friction surface for shear forces or other non-perpendicular forces applied to the surface of the conductive target 140. In some embodiments, the compliant material 145 may extend over the surface of the conductive target 140 and the pliable material 130 thereby coupling to the housing (e.g., the upper structure 110) to constrain the conductive target 140 and the pliable material 10 in the X-Y directions. This configuration may also be used to pre-compress the pliable material 130. It should be understood that the compliant material 145 is not provided in some embodiments.

The housing may further include openings 122 in the upper structure 110 and/or the lower structure 112. The openings 122 may provide access to connections between flexible tactile sensor 100 modules and/or processors. The connections may be electrical and/or mechanical. Electrical connections may be facilitated by an electrical terminal disposed on the PCB 120 within the housing and wiring harnesses and mating connectors extending through the openings. Mechanical connections may be implemented to connect multiple flexible tactile sensor 100 modules together in a row, a column, or an array. In other embodiments, no openings are provided.

The lower structure 112 of the housing includes the PCB 120 and other electronic components. In some embodiments, a ferrite material (not shown) may be positioned between the PCB 120 and the lower structure 112. The ferrite material may be in the form of a sheet and configured to constrain the electromagnetic field created by the plurality of coils 125 disposed in or on the PCB 120. This concentrates the magnetic flux and redirects it toward the conductive target 140, which may also increase the range of the sensor. In some embodiments, a ferrite material may be applied to the first surface 140*a* of the conductive target 140. The application of a ferrite material on the first surface 140*a* of the conductive target 140 may further help prevent the plurality of coils 125 from sensing beyond the conductive target 140. This may be beneficial when objects that the flexible tactile sensor 100 is interfacing with are large metallic objects such as pots and pans.

Figure 1B:
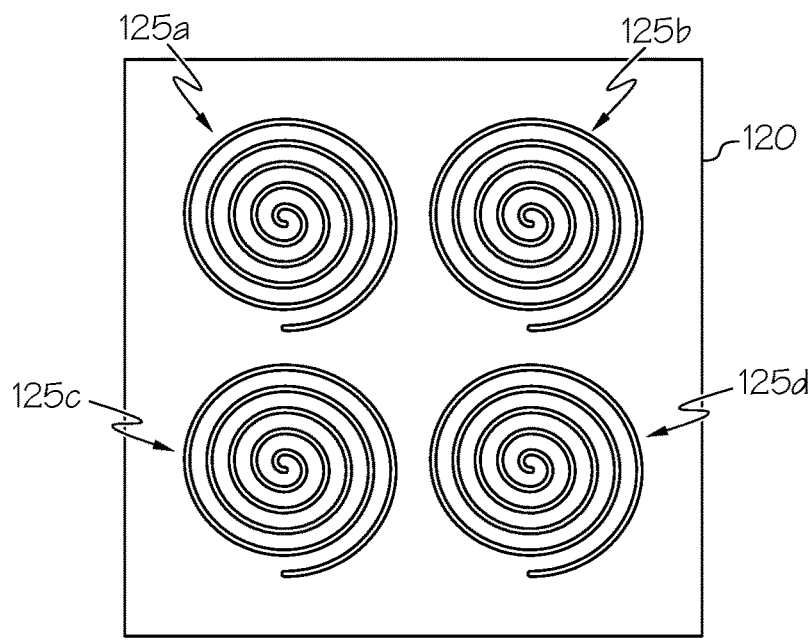
FIG. 1B schematically depicts a top-down view of an illustrative coil arrangement for a flexible tactile sensor, according to one or more embodiments shown and described herein.

Referring now to FIG. 1B, a top-down view of an illustrative coil arrangement for a flexible tactile sensor 100 is schematically depicted. Coil arrangements of the present disclosure include at least three coils arranged in a planar array configuration with each other. FIG. 1B depicts a PCB 120 that includes four coils 125*a*, 125*b*, 125*c*, and 125*d*. The coils 125*a*-125*d* (collectively referenced as coils 125) may be configured on or within the PCB 120. That is, the coils 125 may be formed on the surface of the PCB 120 as a layer of the PCB 120 or the coils 125 may be formed and/or embedded with the PCB 120. The coils 125 are planar coils having a predetermined number of turns. Configurations of three or more coils 125 enable rich sensing having multiple points of measurement. That is, compound rotations about the X and Y-axes enable the sensor to measure the normal force vector.

Figure 1C:
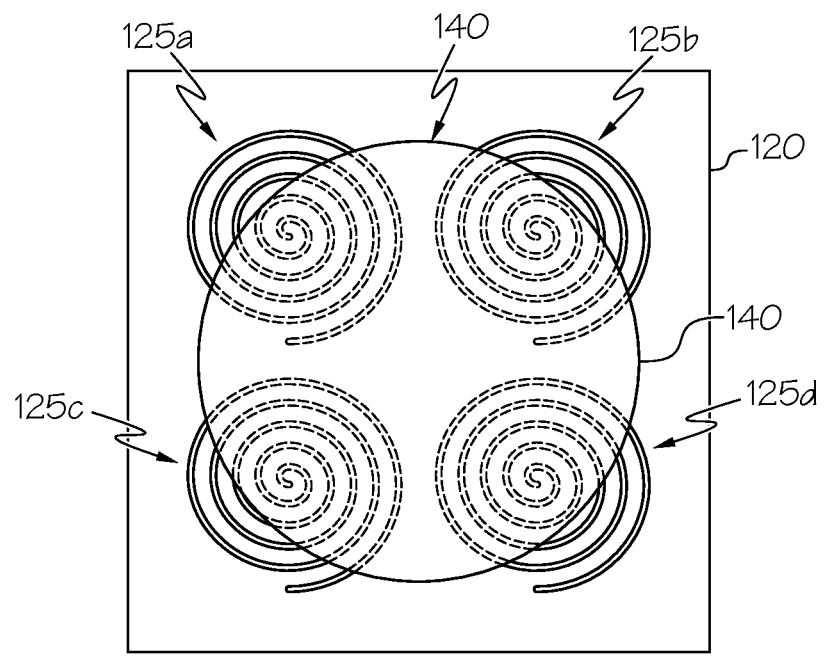
FIG. 1C schematically depicts a top-down view of an illustrative coil arrangement on a printed circuit board and positioned below a conductive target of a flexible tactile sensor, according to one or more embodiments shown and described herein.

Referring now to FIG. 1C, the top-down view of the flexible tactile sensor 100 depicted in FIG. 1B now shows the conductive target 140. The conductive target 140 as described herein is positioned, for example, in vertical alignment with the plurality of coils 125 such that a portion of the conductive target 140 vertically aligns with the plurality of coils 125. The flexible tactile sensor 100 depicted in FIG. 1C is in a contactless state. Additionally, the conductive target 140 is depicted as a circular disc. However, in other embodiments, the conductive target 140 may have other shapes such as a triangular plate or a square plate. The shape of the conductive target 140 may be selected in conjunction with the arrangement of the array of three or more coils 125.

Figure 1D:
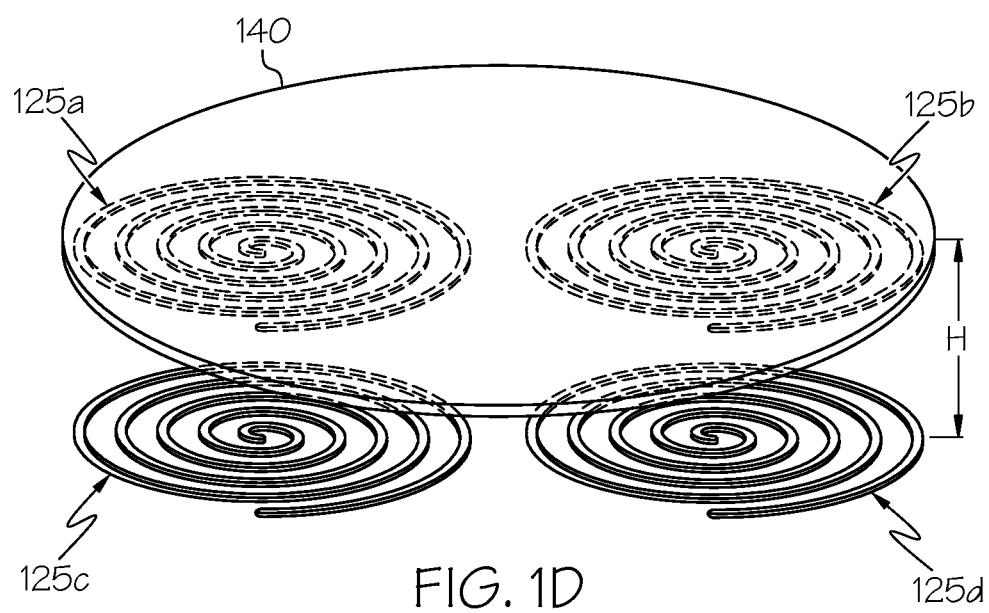
FIG. 1D schematically depicts a perspective side view of an illustrative coil arrangement positioned below a conductive target of a flexible tactile sensor, according to one or more embodiments shown and described herein.

Referring now to FIG. 1D, a perspective side view of an illustrative coil arrangement positioned below a conductive target 140 of a flexible tactile sensor 100 from FIG. 1C is schematically depicted. the conductive target 140 is spaced apart from the coils 125 by a height H. The spacing between the conductive target 140 and the coils 125 may be occupied by the pliable material 130, which enables the conductive target 140 to move with respect to the coils 125. As described in more detail herein, as the respective height between the conductive target 140 and select coils 125 changes the inductance of the coils 125 changes, which may be sensed and used to determine the change in position of the conductive target 140.

Figure 1E:
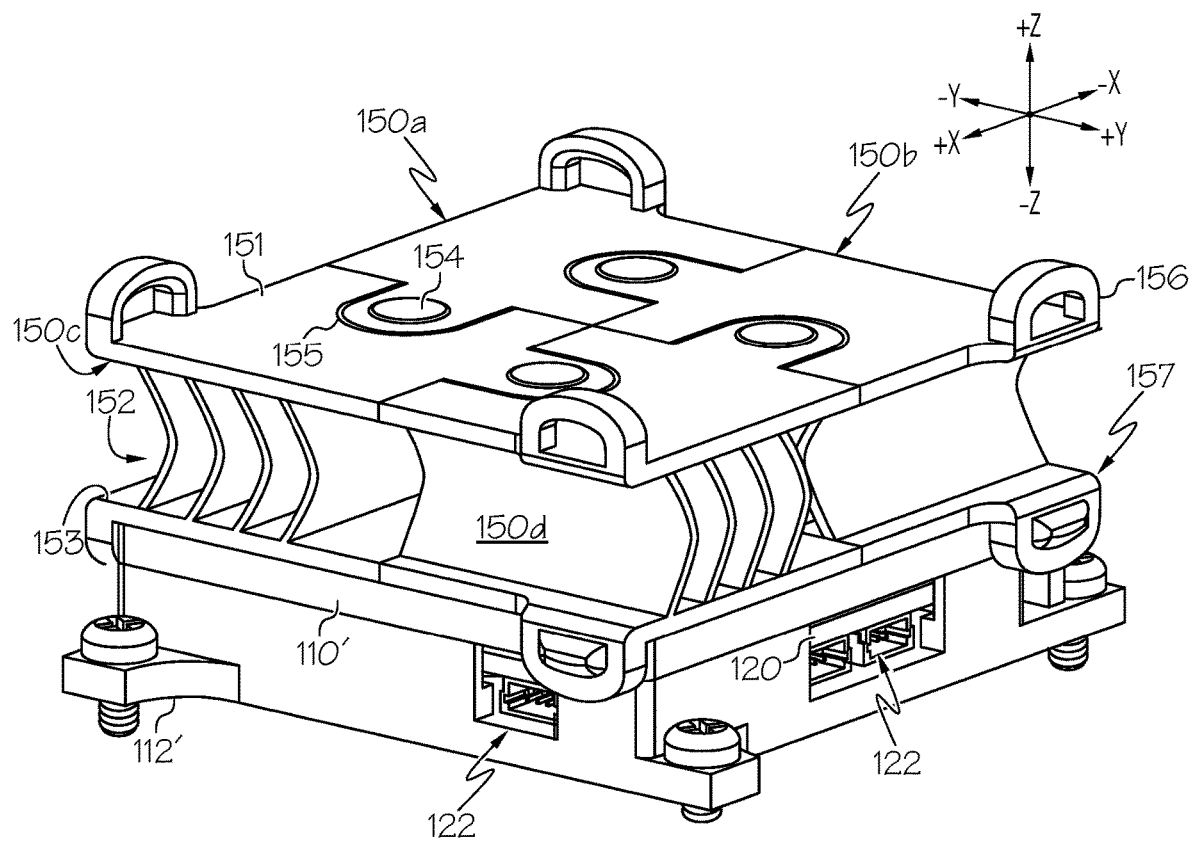
FIG. 1E schematically depicts a perspective view of an illustrative flexible tactile sensor having a modular flexible layer, according to one or more embodiments shown and described herein.

Referring now to FIG. 1E, a perspective view of an illustrative flexible tactile sensor 100 having a modular flexible layer is schematically depicted. In particular, the embodiment depicted in FIG. 1E includes a non-limiting example of a modular flexible layer 150 forming a mechanical structure type of pliable material 130. For example, the pliable material 130 may be a 3D-printed, molded, machined, or otherwise formed structure. The modular flexible layer 150 functioning as the pliable material 130 portion of the flexible tactile sensor 100 may comprise a plurality of interlocking segments 150*a*, 150*b*, 150*c*, and 150*d* that can independently flex thereby enabling the modular flexible layer 150 to support the conductive target 140 (not shown in FIG. 1E) and respond to forces applied to the conductive target 140. For example, each of the plurality of interlocking segments 150*a*, 150*b*, 150*c*, and 150*d* includes a first surface 151 opposite a second surface 153. The first surface 151 and the second surface 153 are interconnected by a plurality of flexible members 152. The plurality of flexible members 152 may be configured to bend, flex, or fold when stressed and return to a relaxed positioned when the source of stresses is removed. For example, the plurality of flexible members 152 may be rib-shaped structures extending from the first surface 151 to the second surface 153. However, embodiments are not limited to rib-shaped structures. Furthermore, each of the plurality of interlocking segments 150*a*, 150*b*, 150*c*, and 150*d* includes a first interlocking feature 155 configured to receive a second interlocking feature 154. For example, the first interlocking feature 155 may be a flange having a receptacle for receiving the second interlocking feature 154. The first interlocking feature 155 and second interlocking feature 154 are positioned on different edges of each of the plurality of interlocking segments 150*a*, 150*b*, 150*c*, and 150*d* so that one interlocking segment 150*a* may be connected to another interlocking segment 150*b*.

Each of the plurality of interlocking segments 150*a*, 150*b*, 150*c*, and 150*d* further include a third interlocking feature 156 extending vertically (+Z-axis direction) from the first surface 151 of each of the plurality of interlocking segments 150*a*, 150*b*, 150*c*, and 150*d*. The third interlocking features 156 are configured to mate with a corresponding feature on the conductive target 140 thereby coupling the modular flexible layer 150 with the conductive target 140. Similarly, each of the plurality of interlocking segments 150*a*, 150*b*, 150*c*, and 150*d* further include a fourth interlocking feature 157 extending vertically (−Z-axis direction) from the second surface 153 of each of the plurality of interlocking segments 150*a*, 150*b*, 150*c*, and 150*d*. The fourth interlocking features 157 are configured to mate with a corresponding feature on the upper structure 110' thereby coupling the modular flexible layer 150 with the upper structure 110'. The upper structure 110' couples to a lower structure 112', which functions similar to the upper and lower structures 110 and 112 depicted and described with reference to FIG. 1A.

Figure 2A:
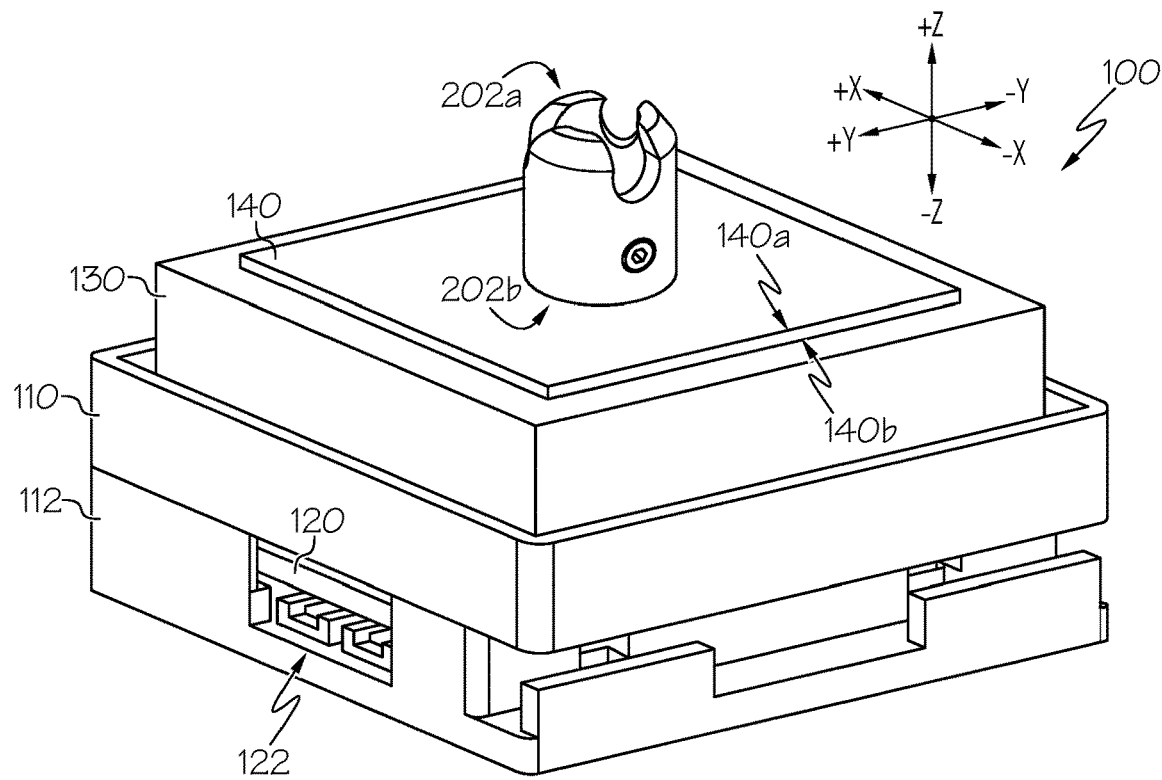
FIG. 2A depicts the illustrative flexible tactile sensor as depicted in FIG. 1A-1E having a first illustrative tool holder for a tool, according to one or more embodiments shown and described herein.

Referring now to FIG. 2A, the illustrative flexible tactile sensor 100 as depicted in FIGS. 1A-1E having a first illustrative tool holder 200 for a tool 206 is depicted. It should be understood that embodiments of the tool holder 200 are not limited by the shape or configuration of the illustrative tool holder 200 shown in FIGS. 2A-2B. In this illustrative embodiment, the tool holder 200 is a ball-and-socket mount. In other embodiments, the tool holder 200 may be any kind of coupling device having a receiving end for coupling with a connecting end, wherein the receiving end may be affixed to the first surface 140*a* of the flexible tactile sensor 100, the connecting end may be affixed to a tool 206, and the receiving and connecting ends can be rigidly coupled so as not to absorb the contact force measurements of the flexible tactile sensor 100. The tool holder 200 may be affixed to the first surface 140*a* of the flexible tactile sensor 100 by a fixation point 202*b*. The fixation point 202*b* may be soldered, welded, screwed, glued, or otherwise affixed to the first surface 140*a* of the flexible tactile sensor 100.

Figure 2B:
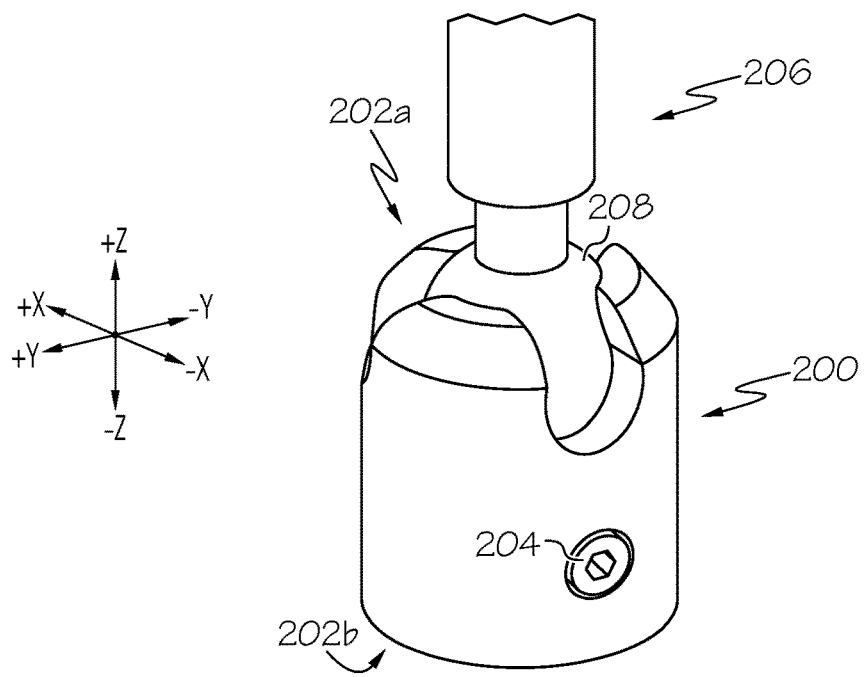
FIG. 2B depicts the first illustrative tool holder for a tool, according to one or more embodiments shown and described herein.

Referring now to FIG. 2B, the first illustrative tool holder 200 for a tool 206 is depicted. The tool holder 200 has a receptacle 202*a* for receiving a connector 208 to couple the tool 206 to the tool holder 200. The receptacle 202*a* includes a plurality of prongs, walls, latches, grips, and/or the like for holding the connector 208 in place. The plurality of prongs may have grooves for securing the tool 206 in a position, such as a right-angle position wherein the tool 206 is positioned such that it forms a right-angle with the tool holder 200. The connector 208 of the illustrated embodiments is a ball on the end of a tool 206. In other embodiments, the connector 208 may be of any shape corresponding to the receptacle 202*a*. For example, the connector 208 may be a rectangular shape, elliptical shape, oval shape, or any other polygonal shape. The grip of the connector 208 by the receptacle 202*a* may be modified by a locking mechanism 204. The locking mechanism 204 may be loosened to adjust the position of the tool 206 and/or replace the tool 206. The locking mechanism 204 may be tightened to secure the tool 206 for use. The receptacle 202*a* of the tool holder 200 may be made of a rigid material such as, for example, plastic, carbon, ceramic, glass, metal, and/or the like. The connector 208 may also be a rigid material, and in some embodiments made of the same as the receptacle 202*a*.

The tool 206 having the connector 208 to be used by a robot having a flexible tactile sensor 100 may be any kind of tool that may be used to exert continuous force such as, for example, squeegees, spatulas, grinders, peelers, cutting tools, pry bars, and the like. The tool 206 may be made of a rigid material such as, for example, plastic, carbon, ceramic, glass, metal, and/or the like so as to not absorb contact forces between the tool 206 and a working surface. In some embodiments, the connector 208 may be removably attached to the tool 206. For example, the connector 208 may threaded for screwing into a receptacle built into the tool 206.

In some embodiments, the pliable material 130 is a flexible structure, like that of FIG. 1E, comprising a first surface 151 opposite and spaced apart from a second surface 153 and a plurality of flexible ribs 152 coupling the first surface 151 to the second surface 153, wherein the plurality of flexible ribs 152 are configured to fold in response to a contact force being applied to the conductive target 140. In such embodiments, each of the plurality of interlocking segments 150*a*, 150*b*, 150*c*, and 150*d* include a third interlocking feature 156 extending vertically (+Z-axis direction) from the first surface 151 of each of the plurality of interlocking segments 150*a*, 150*b*, 150*c*, and 150*d*. The third interlocking features 156 may function as a tool holder 200 that is configured to mate with a corresponding tool 206 thereby coupling the modular flexible layer 150 with the tool 206.

Figure 3A:
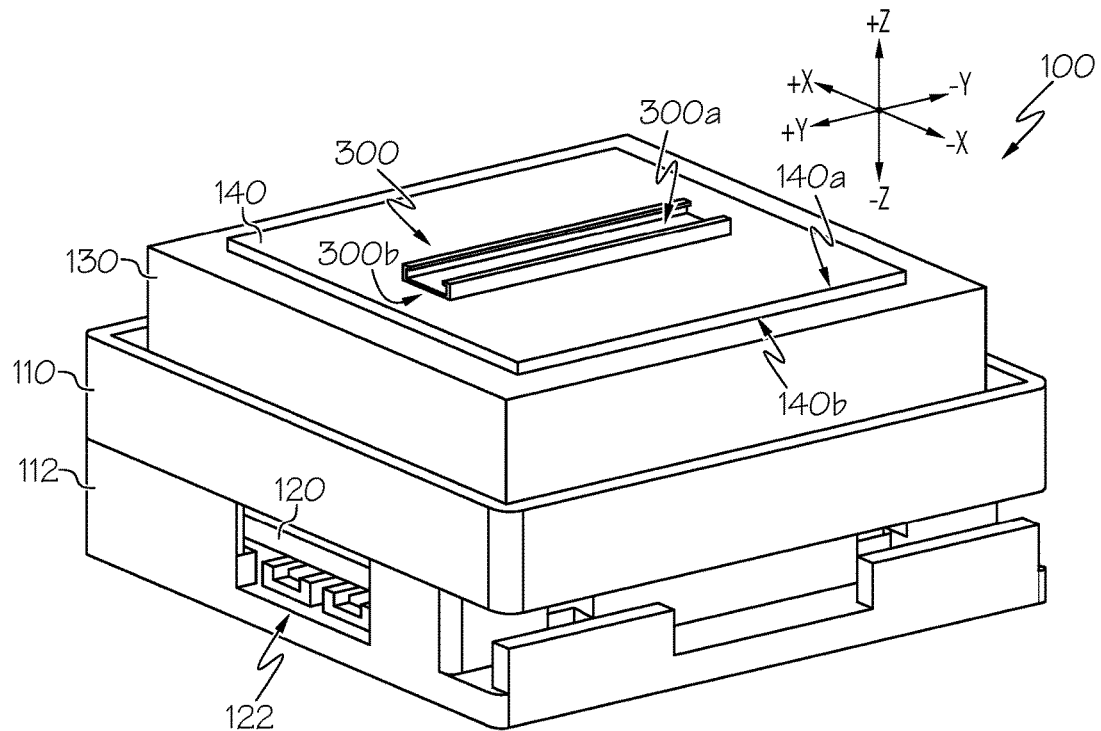
FIG. 3A depicts the illustrative flexible tactile sensor as depicted in FIG. 1A-1E having a second illustrative tool holder for a tool, according to one or more embodiments shown and described herein.

Referring now to FIG. 3A, the illustrative flexible tactile sensor 100 as depicted in FIG. 1A-1E having a second illustrative tool holder 300 for a tool is depicted. It should be understood that embodiments of the tool holder 300 are not limited by the shape or configuration of the illustrative tool holder 300 shown in FIGS. 3A-3B. In this illustrative embodiment, the tool holder 300 is a track, having a first surface 300*a* and a second surface 300*b*, that connects to a rail 306, having a raised portion 306*a* and edges 306*b*. In other embodiments, the tool holder 300 may be any kind of coupling device having a receiving end for coupling with a connecting end, wherein the receiving end may be affixed to a first surface 140*a* of the flexible tactile sensor 100, the connecting end may be affixed to a tool, and the receiving and connecting ends can be rigidly coupled so as to not to absorb the contact force measurements of the flexible tactile sensor 100. The tool holder 300 may be affixed to the first surface 140*a* of the flexible tactile sensor 100 by the second surface 300*b* of the tool holder 300. The second surface 300*b* of the tool holder 300 may be soldered, welded, screwed, glued, or otherwise affixed to the first surface 140*a* of the flexible tactile sensor 100.

Figure 3B:
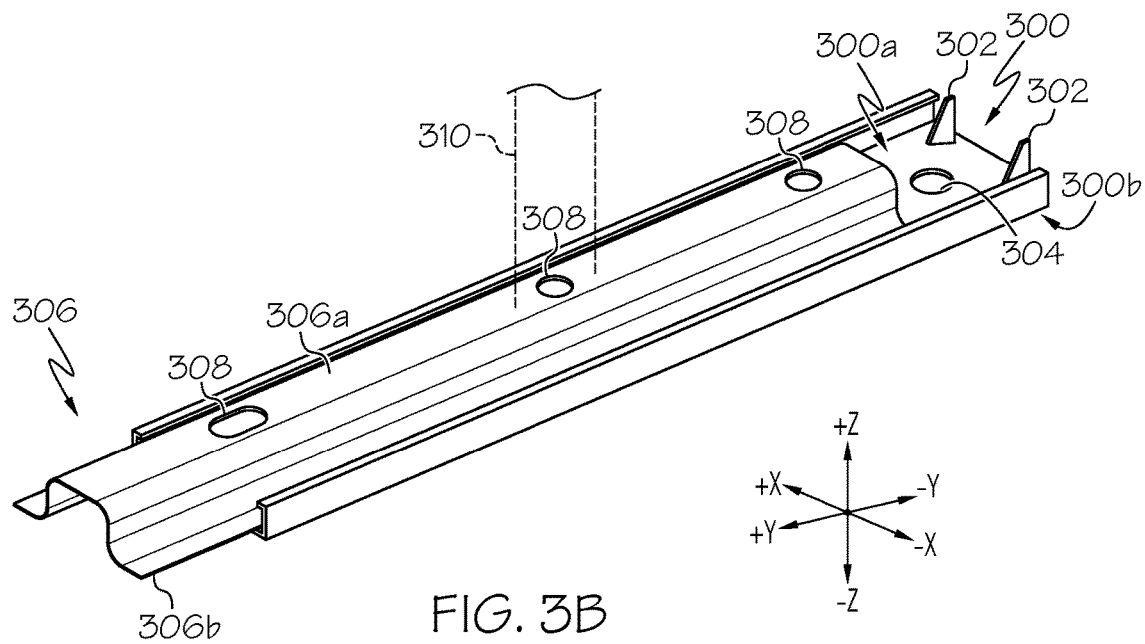
FIG. 3B depicts the second illustrative tool holder for a tool, according to one or more embodiments shown and described herein.
Figure 4A:
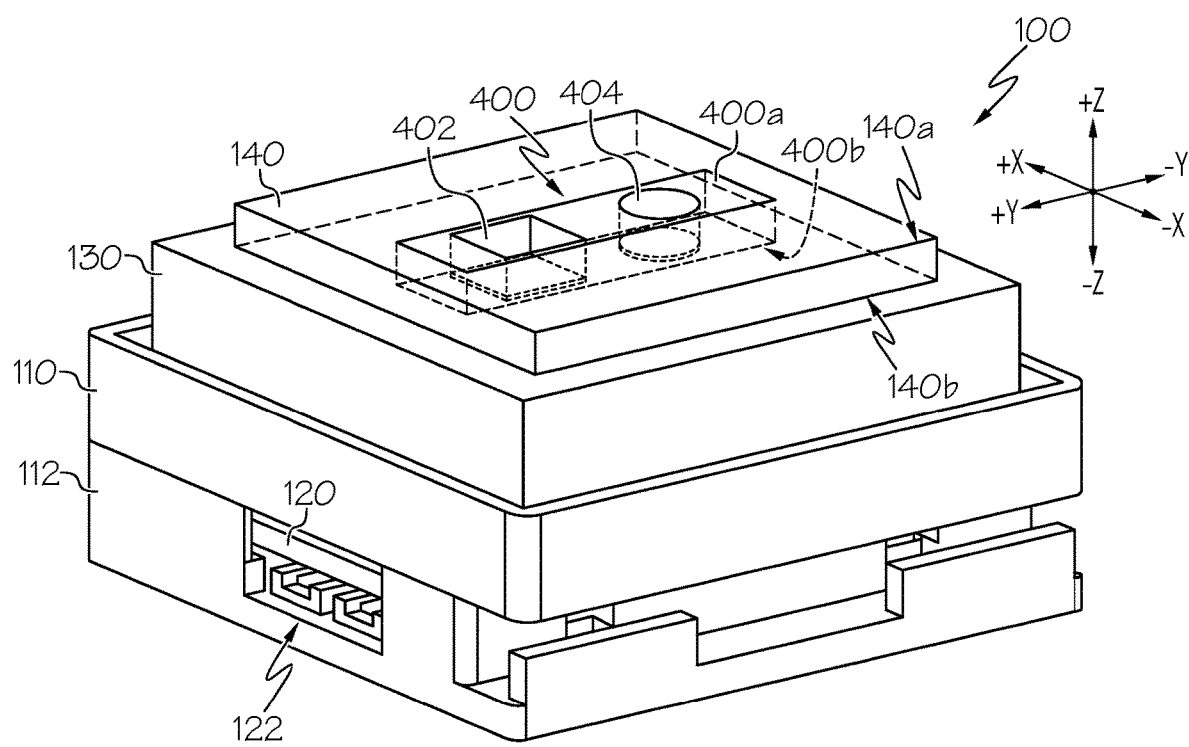
FIG. 4A depicts the illustrative flexible tactile sensor as depicted in FIG. 1A-1E having a third illustrative tool holder for a tool, according to one or more embodiments shown and described herein.
Figure 4B:
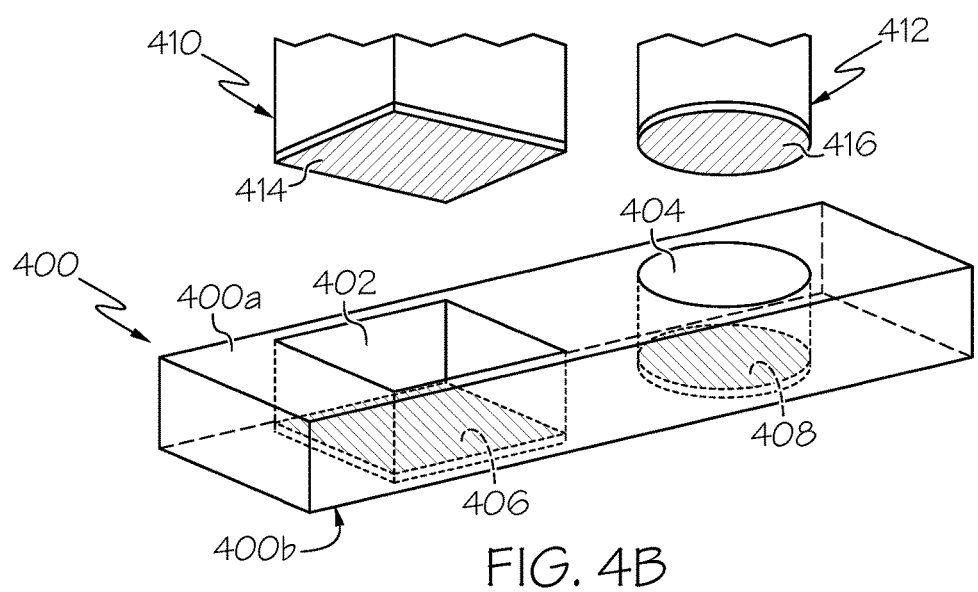
FIG. 4B depicts the third illustrative tool holder for a tool, according to one or more embodiments shown and described herein.

Referring now to FIG. 3B, the second illustrative tool holder 300 for a tool 310 is depicted. The tool holder 300 is a track for receiving a rail 306 to couple the tool 310 to the tool holder 300. The tool holder 300 of the tool holder 300 may be made of a rigid material such as, for example, plastic, carbon, ceramic, glass, metal, and/or the like. The tool holder 300 is a receptacle having a plurality of walls configured to slidably receive a rail 306 such that the rail 306 is secured from moving in the X-direction and the Z-direction. In some embodiments, the tool holder 300 may include end nubs 302 to secure the rail from moving in the Y-direction. In some embodiments, the tool holder 300 may include holes 304 for securing the rail 306 to the tool holder 300. For example, a screw may be fastened through the hole 308 of the rail 306 and the hole 304 of the tool holder 300 to secure the rail 306 to the tool holder 300.

The rail 306 may have a plurality of edges 306*b* configured to slide into the tool holder 300 and fit securely therein. The rail 306 of the tool holder 300 may be made of a rigid material such as, for example, plastic, carbon, ceramic, glass, metal, and/or the like. The rail 306 may also have a raised portion 306*a* having a plurality of holes 308. The plurality of holes 308 may be used to fix the rail 306 to a tool 310. For example, rather than a ball connector 208 as shown in FIG. 2B, the tool 310 may be affixed to the flexible tactile sensor 100 by the rail 306 of the tool 310 slidably engaging with the tool holder 300 of the flexible tactile sensor 100.

The tool 310 having the rail 306 to be used by a robot having a flexible tactile sensor 100 may be any kind of tool 310 that may be used to exert continuous force such as, for example, squeegees, spatulas, grinders, peelers, cutting tools, pry bars, and the like. The tool 310 may be made of a rigid material such as, for example, plastic, carbon, ceramic, glass, metal, and/or the like so as to not absorb contact forces between the tool 310 and a working surface. In some embodiments, the rail 306 may be removably attached to the tool 206 such as, for example, by screws, latches, buttons, and/or the like. For example, the holes 308 of the rail 306 may be configured to receive a tool 310 having a threaded end to be screwed into the rail 306. In some embodiments, the tool 310 may be secured to more than one hole 308. In some embodiments, one or more of the holes 308 of the rail 306 may be used to further secure the rail 306 to the tool holder 300. For example, screws may be placed through one or more holes 308 to secure the rail 306 to the tool holder 300.

Referring now to FIG. 4A, the illustrative flexible tactile sensor 100 as depicted in FIG. 1A-1E having a third illustrative tool holder 400 for a tool is depicted. It should be understood that embodiments of the tool holder 400 are not limited by the shape or configuration of the illustrative tool holder 400 shown in FIGS. 4A-4B. In this illustrative embodiment, the tool holder 400 is a device for coupling with a connecting end 414, 416. The tool holder 400 may have a first surface 400a and a second surface 400b, wherein the tool holder 400 may be embedded into the conductive target 140 of the flexible tactile sensor 100 such that the first surface 400a is exposed. The tool holder 400 of the tool holder 400 may be made of a rigid material such as, for example, plastic, carbon, ceramic, glass, metal, and/or the like. In some embodiments, the tool holder 400 may be integrated into and/or made of the same material as the conductive target 140. In some embodiments, the first surface 400a of the tool holder 400 is on the same plane as the first surface 140a of the conductive target 140. In some embodiments, the tool holder 400 and the conductive target 140 may be a single piece of material.

Referring now to FIG. 4B, the third illustrative tool holder for a tool is depicted. The tool holder 400 may have a plurality of receptacles 402, 404. Each receptacle of the plurality of receptacles 402, 404 may be configured to receive a different type of connecting ends 414, 416 to couple the tool 410, 412 to the tool holder 400. For example, in FIGS. 4A-4B, receptacle 402 is square to receive connecting end 414 and receptacle 404 is round to receive connecting end 416. In some embodiments, the plurality of receptacles 402, 404 may be used to receive a plurality of connecting ends 414, 416 belonging to a single tool. The receptacles 402, 404 may also have an attraction mechanism 406, 408 for helping keep tools 410, 412 in place. The attraction mechanism 406, 408 may be a magnet, hook and loop fastener, adhesive, or any other material that can connect to a corresponding material. For example, the receptacles 402, 404 may contain magnets for retaining connecting ends 414, 416 having a corresponding magnetic material.

The tools 410, 412 having the connecting ends 414, 416 to be used by a robot having a flexible tactile sensor 100 may be any kind of tool that may be used to exert continuous force such as, for example, squeegees, spatulas, grinders, peelers, cutting tools, pry bars, and the like. The tools 410, 412 may be made of a rigid material such as, for example, plastic, carbon, ceramic, glass, metal, and/or the like so as to not absorb contact forces between the tools 410, 412 and a working surface. The connecting ends 414, 416 may be affixed to a tool 410, 412, and the tool holder 400 and connecting ends 414, 416 can be rigidly coupled so as not to absorb the contact force measurements of the flexible tactile sensor 100. The connecting ends 414, 416 may also be a rigid material such as, for example, plastic, carbon, ceramic, glass, metal, and/or the like. In some embodiments, the connecting ends 414, 416 may be made of the same material as the tool holder 400. In some embodiments, a tool may have multiple connecting ends 414, 416 to couple with the tool holder 400.

In some embodiments, the pliable material 130 is a flexible structure, like that of FIG. 1E, comprising a first surface 151 opposite and spaced apart from a second surface 153 and a plurality of flexible ribs 152 coupling the first surface 151 to the second surface 153, wherein the plurality of flexible ribs 152 are configured to fold in response to a contact force being applied to the conductive target 140. In such embodiments, each of the plurality of interlocking segments 150a, 150b, 150c, and 150d may each include one or more receptacles, similar to receptacle 402 or receptacle 404.

Figure 5A:
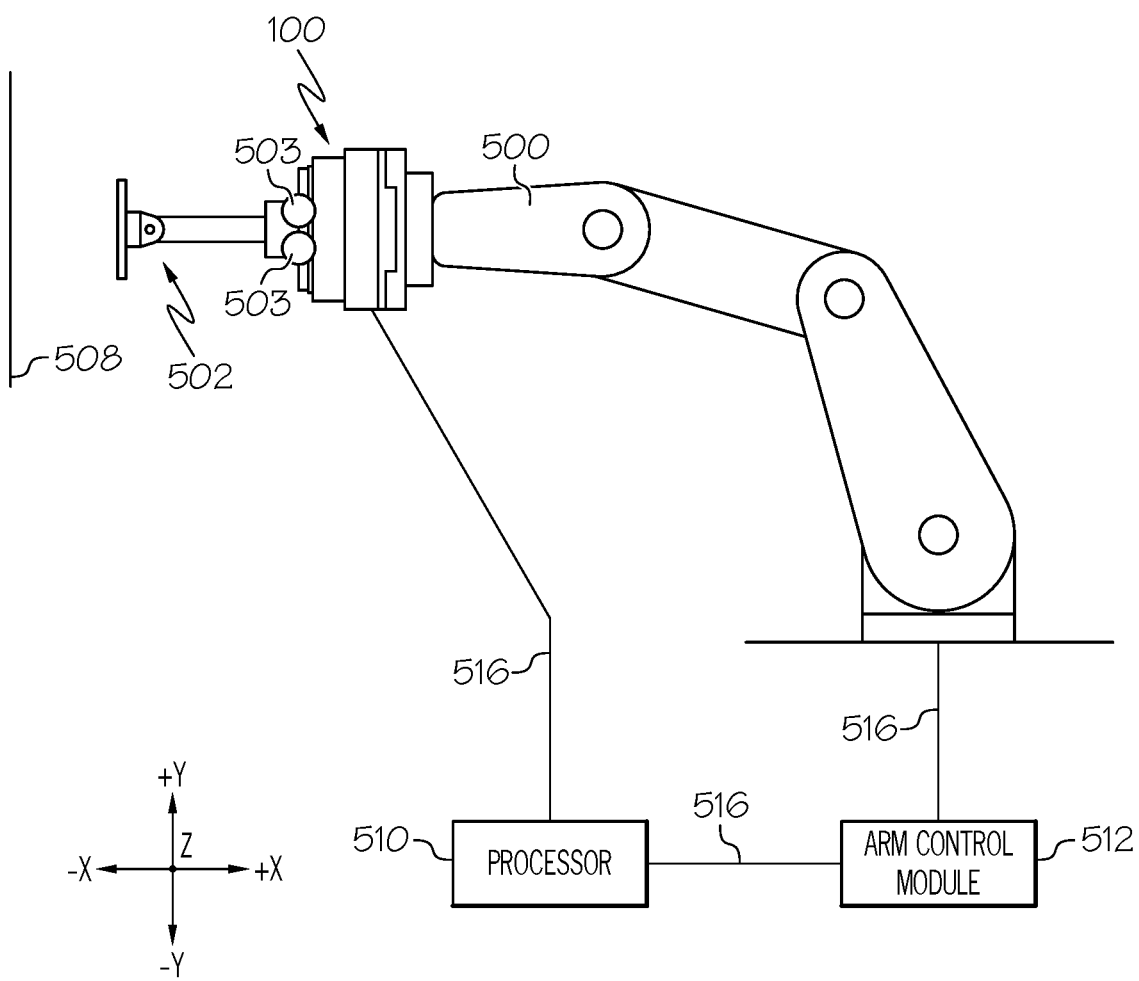
FIG. 5A schematically depicts an illustrative side perspective view of a robotic arm having the illustrative flexible tactile sensor as depicted in FIG. 1A-1E, according to one or more embodiments shown and described herein.

Referring now to FIG. 5A, an illustrative side perspective view of a robot arm 500 having the illustrative flexible tactile sensor 100 as depicted in FIG. 1A-1E is schematically depicted. The robot arm 500 is not limited by the shape or configuration of the robot arm depicted in FIG. 5A. The robot arm 500 may be communicatively connected to a processor 510 and an arm control module 512 via a communication path 516.

The processor 510 may include one or more processors that may be any device capable of executing machine-readable and executable instructions. Accordingly, each of the one or more processors of the processor 510 may be a controller, an integrated circuit, a microchip, or any other computing device. The processor 510 is coupled to the communication path 516 that provides signal connectivity between the various components of the robot arm 500. Accordingly, the communication path 516 may communicatively couple any number of processors of the processor 510 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

The communication path 516 may be formed from any medium that is capable of transmitting a signal such as, e.g., conductive wires, conductive traces, optical waveguides, and the like. In some embodiments, the communication path 516 may facilitate the transmission of wireless signals, such as Wi-Fi, Bluetooth, Near-Field Communication (NFC), and the like. Moreover, the communication path 516 may be formed from a combination of mediums capable of transmitting signals. In one embodiment, the communication path 516 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The arm control module 512 controls the operation of the robot arm 500 and is connected to the robot arm 500 via communication path 516. The arm control module 512 may contain machine readable and executable instructions for operating the robot arm 500. The arm control module 512 may control the robot arm 500 by directing it to rotate individual step motors connected to each joint of the robot arm 500 to move an end effector 502 from place to place. For example, the robot arm 500 may move the end effector 502 along a working surface 508. The arm control module 512 may receive information regarding the level and direction of the applied force from the end effector 502, which may be transmitted to the arm control module 512 from the flexible tactile sensor 100 via processor 510. With the received information, the arm control module 512 may adjust its control of the robot arm 500 to achieve an appropriate level and direction of applied force from the end effector 502 as programmed into the arm control module 512.

The flexible tactile sensor 100 may include a housing having an upper structure 110 and a lower structure 112 coupled to the upper structure 110. The housing may have one or more connectors configured to be received by the robot arm 500. For example, as shown in FIG. 1E, the lower structure 112' may have a plurality of screws for fastening the flexible tactile sensor 100 to the robot arm 500. The flexible tactile sensor 100 may be of any embodiment described in FIGS. 1A-1E having any tool holder 503 described in FIGS. 2A-4B. The housing may include openings 122 in either or both the upper structure 110 and/or the lower structure 112 for providing access to connections between the flexible tactile sensor 100 modules and/or processor 510. The connections may be facilitated by an electrical terminal disposed on the PCB 120 within the housing and wiring harness and mating connectors extending through the opening 122. The communication path 516 may be connected from the electrical terminal disposed on the PCB 120 to the processor 510 to provide the processor 510 with force and direction feedback information of the end effector 502. The processor 510 may pass the information to the arm control module 512 via communication path 516 to modify the operation of the robot arm 500.

The tool holder 503 of the flexible tactile sensor 100 may be connected to an end effector 502, also referred to as a tool. For example, the tool holder 503 may be the tool holder 200 as shown in FIGS. 2A-2B, the tool holder 300 of FIGS. 3A-3B, or the tool holder 400 of FIGS. 4A-4B. The end effector 502 to be used by the robot arm 500 having a flexible tactile sensor 100 may be any kind of tool that may be used to exert continuous force such as, for example, squeegees, spatulas, grinders, peelers, cutting tools, pry bars, and the like. For example, the end effector 502 is a squeegee. The end effector 502 may be made of a rigid material such as, for example, plastic, carbon, ceramic, glass, metal, and/or the like so as to not absorb contact forces between the end effector 502 and a working surface 508. The tool holder 503 may similarly be made of a rigid material.

In the embodiments depicted in FIG. 5A, the end effector 502 is a squeegee and the processor 510 executes instructions to clean a pane of glass (i.e., the working surface 508). The robot arm 500 may begin in a starting position as shown in FIG. 5A. The processor 510 knows that the robot arm 500 is in a starting position because the flexible tactile sensor 100 may indicate that no force is being applied to the end effector 502. The flexible tactile sensor 100 may indicate that no force is being applied to the end effector 502 when the conductive target 140 is placed an initial height H above coils 125 such that the conductive target 140 is evenly covering the coils 125, as shown in FIGS. 1C-1D.

Figure 5B:
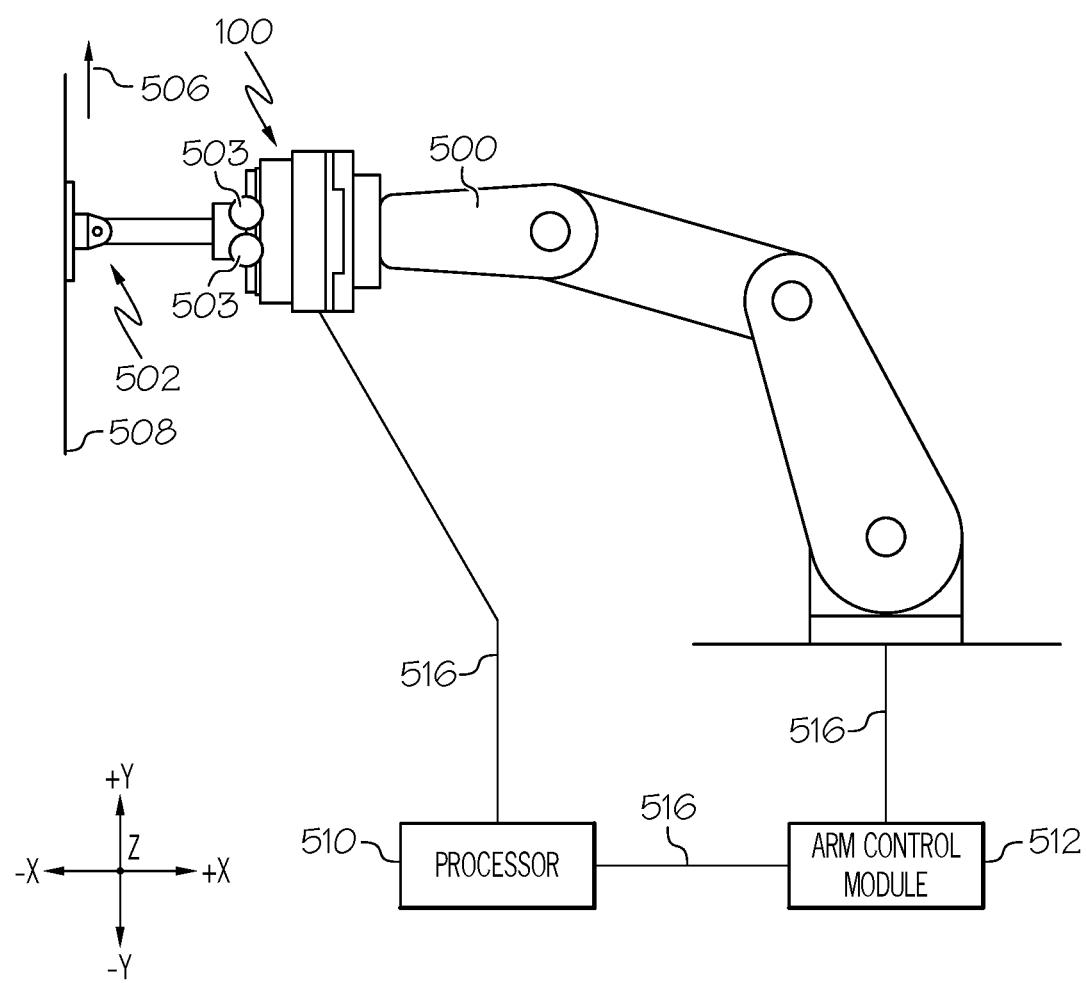
FIG. 5B schematically depicts an illustrative side perspective view of the robot arm of FIG. 5A exerting a force on a working surface via an end effector, according to one or more embodiments shown and described herein.

Referring now to FIG. 5B, the robot arm 500 exerting a force on working surface 508 via the end effector 502 is depicted. The instructions executed by the processor 510 may direct the arm control module 512 to send control signals to the robot arm 500 to move such that the end effector 502 is placed on the working surface 508. The force of the end effector 502 on the working surface 508 may be transferred from the end effector 502 and tool holder 503 to the flexible tactile sensor 100. The forces received by the flexible tactile sensor 100 may cause the pliable material 130 of the flexible tactile sensor 100 to compress and/or shift, thereby causing the conductive target 140 to move with respect to the plurality of coils 125. The processor 510 may receive sensor signals from the flexible tactile sensor 100 indicating the degree and directions to which the conductive target 140 has moved with respect to the plurality of coils 125. The processor 510 may calculate the contact force measurements of the end effector 502 based on the sensor signals from the flexible tactile sensor 100.

The instructions executed by the processor 510 may further direct the arm control module 512 to send control signals to the robot arm 500 to move the end effector 502 in a direction 506 along the working surface 508 to squeegee the working surface 508 with the end effector 502. The forces received by the flexible tactile sensor 100 may cause the pliable material 130 of the flexible tactile sensor 100 to further compress and/or shift, thereby further causing the conductive target 140 to move closer to one or more of the plurality of coils 125 and/or move further from one or more of the plurality of coils 125. The processor 510 may receive additional sensor signals from the flexible tactile sensor 100 indicating the degree and directions to which the conductive target 140 has moved with respect to the plurality of coils 125. The processor 510 may re-calculate the contact force measurements of the end effector 502 based on the sensor signals from the flexible tactile sensor 100. In some embodiments, the processor 510 may continuously receive sensor signals from the flexible tactile sensor 100 and the processor 510 may continuously calculate a contact force measurement of the end effector 502.

When the robot arm 500 has completed the squeegee action, the instructions executed by the processor 510 may further direct the arm control module 512 to send control signals to the robot arm 500 to move end effector 502 back to the starting position, as shown in FIG. 5A. The processor 510 knows that the robot arm 500 has returned to the starting position because the flexible tactile sensor 100 may indicate that no force is being applied to the end effector 502. The flexible tactile sensor 100 may indicate that no force is being applied to the end effector 502 when pliable material 130 has returned to its original form and the conductive target 140 is placed a height H above coils 125 such that the conductive target 140 is evenly covering the coils 125, as shown in FIGS. 1C-1D.

Figure 5C:
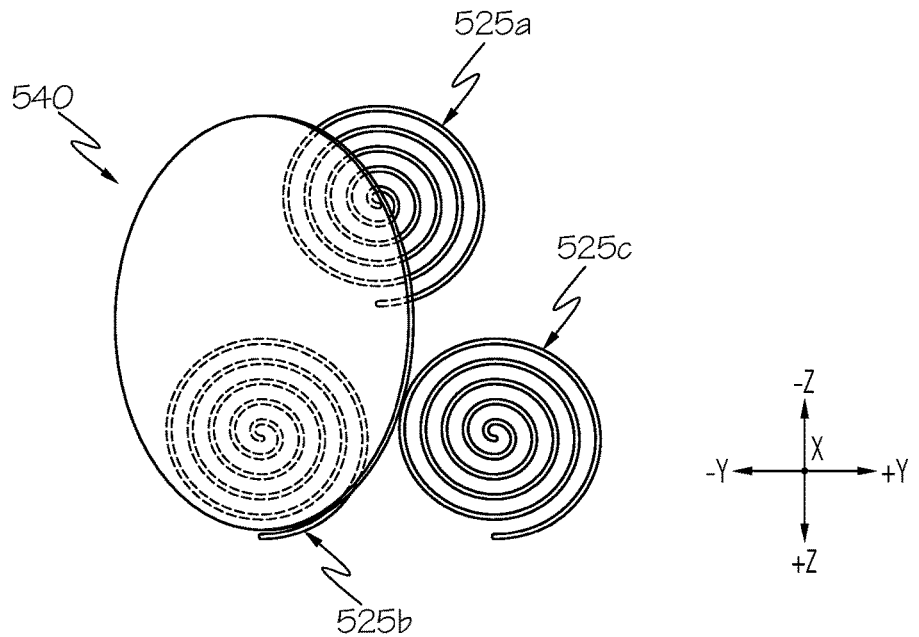
FIG. 5C schematically depicts an illustrative top-down view of a coil arrangement positioned below a conductive target that is shifted laterally and axially rotated as depicted in FIG. 5B, according to one or more embodiments shown and described herein.
Figure 5D:
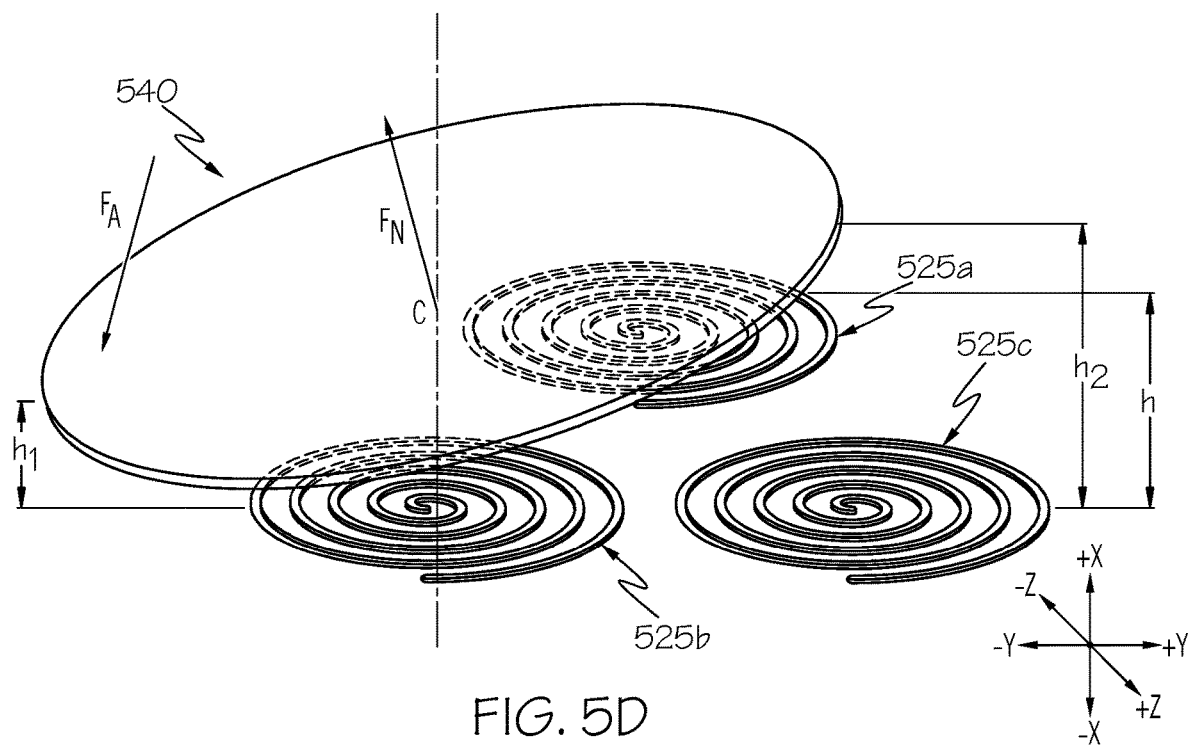
FIG. 5D schematically depicts an illustrative side perspective view of the coil arrangement positioned at the second height below a conductive target that is shifted laterally and axially rotated as depicted in FIG. 5B, according to one or more embodiments shown and described herein.

Referring now to FIGS. 5C and 5D, a top down and side perspective view, respectively, of a conductive target 540 of the flexible tactile sensor 100 of FIG. 5B. Due to the squeegee action in the direction 506 performed by the robot arm 500, the conductive target 540 is under an applied force FA that has a compressive force along the X-axis that is not centered on the conductive target 540 and a shear force along the Y-axis is depicted. When the conductive target 540 receives a compressive force away from the center C of the conductive target and shear force the pliable material 130 (FIG. 1A) is compressed decreasing the distance (height h) that the conductive target 540 is spaced apart from the plurality of coils 525. The pliable material 130 may also deform laterally in response to the shear force, but constrain the conductive target 540 within a range of the plurality of coils 525. This results in unequal changes in the inductance of each of the coils 525 from their initial inductance values. The flexible tactile sensor 100 communicates the new inductance values for each coil 525 to the processor 510. In response to receiving the changed inductance values for each of the coils 525, the processor 510 determines how the conductive target 540 has moved with respect to the plurality of coils and computes the new force normal FN. The conductive target 540 is vertically aligned with the second coil 525b, but at a height h1 that is less than the initial height H. Additionally, the conductive target 540 is vertically aligned with the third coil 525c, but at a height h2 that is greater than the initial height H. Accordingly, the amount the conductive target 540 that is vertically aligned with each coil 525 and the distance (height h1 and h2) between each coil 525 and the conductive target 540 with a coil affects the inductance of the coils 525. Accordingly, changes in the inductance of each of the coils 525 can be computed by the processor 510 into a change in the position and orientation of the conductive target 540.

It should be understood that FIGS. 5C-5D illustrate only a few example orientations that may result from a contact force being applied to the conductive target 540. In each instance, the flexible tactile sensor 100 monitors and transmits changes in the inductance of each of the plurality of coils 525 in the array to the processor 510. The processor 510, based on the changes in inductance and the calibrated characteristics of the pliable material 130 calculates a new force normal (e.g., a force direction and magnitude) for the conductive target 540.

The calculations of the new force normal are possible because the conductive target 540 has a larger surface area than the plurality of coils 525 and is positioned at a predetermined height H (FIG. 1D) above the plurality of coils 525. As described above, when the conductive target 540 is tilted about its centroid, for example, as depicted in FIGS. 5B-5C, the conductive target 540 above second coil 525*b* gets closer to the second coil 525*b* and further from the third coil 525*c*. This causes the inductance of the second coil 525*b* to decrease and the inductance of the third coil 525*c* to increase.

The distance of the conductive target 540 changes monotonically with applied force. The goal of the pliable material 130 is to keep the target from significantly translating on the Y-axis and Z-axis, while allowing compression in the X-axis to be a proxy for measuring the force information (through the monotonic relationship with displacement). When creating a richer sensor with multiple points of measurement (3 or more), the compound rotations about the Y and Z-axes are what allows the flexible tactile sensor 100 to measure the normal force vector.

It should now be understood that embodiments of the present disclosure are directed to flexible tactile sensors capable of holding a tool and measuring contact forces from the tool. The flexible tactile sensor includes a conductive target positioned in a first plane, a tool holder coupled to the conductive target configured to receive a tool, at least three coils forming an array within a second plane, the second plane spaced apart from the first plane, a pliable material coupling the conductive target to the at least three coils, and an electronic device electrically coupled to each of the at least three coils, the electronic device configured to induce an AC signal within each of the at least three coils and measure a change in inductance in the at least three coils in response to movement of the conductive target.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A flexible tactile sensor, comprising:
a conductive target positioned in a first plane;
a tool holder coupled to the conductive target and configured to receive a tool;
at least three coils forming a single-planar array within a second plane, the second plane spaced apart from the first plane;
a pliable material coupling the conductive target to the at least three coils; and
an electronic device electrically coupled to each of the at least three coils, the electronic device configured to induce an AC signal within each of the at least three coils and measure a change in inductance in the at least three coils in response to movement of the conductive target.

2. The flexible tactile sensor of claim 1, wherein the tool holder is embedded in the conductive target.

3. The flexible tactile sensor of claim 1, wherein the tool holder has a receptacle for receiving a connector to couple the tool to the tool holder.

4. The flexible tactile sensor of claim 1, wherein the tool holder has a plurality of receptacles, each receptacle of the plurality of receptacles configured to receive a different type of connector to couple the tool to the tool holder.

5. The flexible tactile sensor of claim 1, wherein the tool holder includes an attraction mechanism attracted to the tool having a connector configured to couple to the tool holder.

6. The flexible tactile sensor of claim 1, further comprising the tool having a connector configured to couple to the tool holder, wherein the tool is affixed to the flexible tactile sensor by coupling the connector with the tool holder.

7. The flexible tactile sensor of claim 1, further comprising a housing having an upper structure and a lower structure coupled to the upper structure, the housing having one or more connectors configured to be received by a robot arm.

8. The flexible tactile sensor of claim 7, wherein the tool holder is provided at an opposite side to the robot arm via the flexible tactile sensor.

9. The flexible tactile sensor of claim 1, wherein the pliable material comprises at least one of a neoprene material, a rubber-like material, or a latex material.

10. The flexible tactile sensor of claim 1, wherein the pliable material is a flexible structure comprising a first surface opposite and spaced apart from a second surface and a plurality of flexible ribs coupling the first surface to the second surface, wherein the plurality of flexible ribs are configured to fold in response to a contact force being applied to the conductive target.

11. A system, comprising: a computing device communicatively coupled to one or more flexible tactile sensors; and
    a flexible tactile sensor comprising:
        a conductive target positioned in a first plane;
        a tool holder coupled to the conductive target and configured to receive a tool;
        at least three coils forming a single-planar array within a second plane, the second plane spaced apart from the first plane;
        a pliable material coupling the conductive target to the at least three coils; and
        an electronic device electrically coupled to each of the at least three coils, the electronic device configured to induce an AC signal within each of the at least three coils and measure a change in inductance in the at least three coils in response to movement of the conductive target, wherein:
    the computing device is configured to:
        receive one or more signals from the electronic device of at least one of the one or more flexible tactile sensors, the one or more signals corresponding to the measured changes in the inductance in the at least three coils; and
        determine a magnitude and direction of a normal force of the tool.

12. The system of claim 11, wherein the tool holder is embedded in the conductive target.

13. The system of claim 11, wherein the tool holder has a receptacle for receiving a connector to couple the tool to the tool holder.

14. The system of claim 11, wherein the tool holder has a plurality of receptacles, each receptacle of the plurality of receptacles configured to receive a different type of connector to couple the tool to the tool holder.

15. The system of claim 11, wherein the tool holder includes an attraction mechanism attracted to the tool having a connector configured to couple to the tool holder.

16. The system of claim 11, further comprising the tool having a connector configured to couple to the tool holder, wherein the tool is affixed to the flexible tactile sensor by coupling the connector with the tool holder.

17. The system of claim 11, further comprising a housing having an upper structure and a lower structure coupled to the upper structure, the housing having one or more connectors configured to be received by a robot arm.

18. The system of claim 17, wherein the tool holder is provided at an opposite side to the robot arm via the flexible tactile sensor.

19. The system of claim 11, wherein the computing device is further configured to determine a shear force applied to the tool based on the measured changes in the inductance in the at least three coils.

20. The system of claim 11, wherein the computing device is further configured to generate, on a display device, a graphical visualization of an orientation of the tool based on the normal force.

* * * * *